United States Patent
Bourgeois

[19]

[11] Patent Number: 6,033,167
[45] Date of Patent: Mar. 7, 2000

[54] HONEYCOMB BAG PAD

[75] Inventor: David F. Bourgeois, Iowa City, Iowa

[73] Assignee: Pactiv Corporation, Lake Forest, Ill.

[21] Appl. No.: 09/130,252

[22] Filed: Aug. 6, 1998

[51] Int. Cl.⁷ .................................................. B60P 7/16
[52] U.S. Cl. ............................ 410/119; 410/36; 410/47; 410/154
[58] Field of Search .................................. 410/119, 117, 410/154, 155, 125, 47, 36, 42; 428/118, 73; 206/522, 592, 593

[56] References Cited

U.S. PATENT DOCUMENTS

| | | |
|---|---|---|
| 1,808,651 | 6/1931 | Gibb et al. . |
| 2,662,638 | 12/1953 | Storer et al. . |
| 2,704,587 | 3/1955 | Pauak . |
| 2,728,479 | 12/1955 | Wheeler . |
| 3,028,981 | 4/1962 | Ford et al. ............................... 410/117 |
| 3,403,780 | 10/1968 | Binkley et al. . |
| 3,405,659 | 10/1968 | Hees ........................................ 410/154 |
| 3,481,813 | 12/1969 | Wiggers . |
| 3,708,084 | 1/1973 | Bixler et al. . |
| 3,890,108 | 6/1975 | Welsh . |
| 3,900,645 | 8/1975 | Morgan . |
| 3,910,485 | 10/1975 | Wandel . |
| 3,987,736 | 10/1976 | Miller ..................................... 410/119 |
| 4,033,455 | 7/1977 | Robison . |
| 4,067,442 | 1/1978 | Howe . |
| 4,142,634 | 3/1979 | Leff et al. . |
| 4,195,732 | 4/1980 | Bell . |
| 4,553,887 | 11/1985 | Reeves ................................... 410/119 |
| 4,572,716 | 2/1986 | West ........................................ 410/36 |
| 4,585,381 | 4/1986 | Boyse ..................................... 410/154 |
| 4,596,541 | 6/1986 | Ward, Sr. et al. . |
| 4,667,823 | 5/1987 | Wolfe, Jr. et al. . |
| 4,854,792 | 8/1989 | Cottone ................................... 410/121 |
| 4,883,179 | 11/1989 | Dionne . |
| 5,175,041 | 12/1992 | Webb et al. . |
| 5,647,703 | 7/1997 | Letts, III ................................... 410/47 |
| 5,676,509 | 10/1997 | Enzu ....................................... 410/119 |
| 5,678,968 | 10/1997 | Bourgeois et al. ...................... 410/119 |
| 5,741,098 | 4/1998 | Letts, III ................................... 410/47 |

FOREIGN PATENT DOCUMENTS

| | | | |
|---|---|---|---|
| 2835219 A1 | 2/1980 | Germany ............................... 410/154 |
| 60335 | 3/1986 | Japan ..................................... 410/119 |
| 803065 | 10/1958 | United Kingdom ..................... 428/73 |
| WO94/27814 | 12/1994 | WIPO . |

OTHER PUBLICATIONS

Honeycomb Structural Products, Inc. brochure entitled "Product Bulletin", 2 pages.
International Honeycomb brochure entitled "Inner Packaging", 4 pages.
Henry Molded Products, Inc. brochure entitled "Stakker Roll Packaging System", 1 page.
Honeycomb Packaging System Keeps Round Roll Round, 6 pages.
Stretch Wrap Roll Guards Product #1 and #2, 4 pages.
Rollguard A New Packaging System, 9 pages.

*Primary Examiner*—Stephen T. Gordon
*Attorney, Agent, or Firm*—Arnold White & Durkee

[57] ABSTRACT

An apparatus for supporting and cushioning objects during shipment. The apparatus comprises an inflatable member and a pad. The pad has a honeycomb core, a front face and a rear face. The rear face of the pad has a rear recess adapted to hold the inflatable member. The pad may further include a front recess in the front face for cooperatively receiving the surface of the object. The front recess may be defined by a portion of the pad in which the honeycomb core has been compressively deformed to a predetermined depth and a predetermined width to cushion the object received in the front recess.

28 Claims, 5 Drawing Sheets

HONEYCOMB BAG PAD

BACKGROUND OF THE INVENTION

1. Field of the Invention

The present invention relates generally to a honeycomb pad for supporting and cushioning an object during shipment and, more particularly to a honeycomb pad with an inflatable member.

2. Description of the Related Art

Objects when transported by truck, rail, or other means have a tendency to move about and become damaged during transport. Typically, most objects, such as furniture and palleted items, require packaging material to be placed around them during shipment. The packaging material supports and cushions the objects to prevent the objects from vibrations, quick stops and jarring movements.

One example of objects that require support and cushioning is rolls of web material such as paper. When the rolls of web material are transported by truck, rail or other transport means, the rolls have a tendency to move. When the rolls move during transport, the rolls tend to become damaged, abraised, pierced and cut.

To secure and protect the rolls of web material during transport, the prior art has positioned devices between the rolls for supporting and cushioning the rolls. U.S. Pat. No. 4,572,716 to West discloses a device for fixing the position of rolls of web material during shipment. The West device includes an inflatable member, an opposite angled honeycomb open cell contact pad and a flat honeycomb support pad sandwiched between the inflatable member and contact pad. The contact pad engages the vertically stacked rolls of web material, and the combination of the inflatable member, support pad and contact pad support and hold the vertically stacked rolls of web material in position.

One disadvantage associated with the West device is that the inflatable member, the flat support pad and angled contact pad must be individually placed together between the rolls. Another disadvantage is the tendency for the open honeycomb cells of the angled contact pads to "grasp" onto the web material during shipment and to tear the web. Yet a further disadvantage is the embossment of honeycomb pattern of the open cell contact pads on the web material.

Another device used to secure and protect rolls of web material during transport is disclosed in U.S. Pat. No. 5,678,968 to Bourgeois et al. The Bourgeois device includes an inflatable member and a honeycomb pad or spacer. The honeycomb spacer has a recess therein which is conformed to receive and cushion the roll of web material. The combination of the inflatable member and honeycomb spacer support and hold the vertically stacked rolls of web material in position.

One disadvantage associated with the Bourgeois device is that the inflatable member and honeycomb spacer must be individually positioned between rolls of web material by an operator. The combination of honeycomb spacer and inflatable member perform best when the longitudinal center of the inflatable member aligns with the crown of the roll; however, it is often difficult for the operator to position the inflatable member exactly at the desired position. Another disadvantage is the honeycomb spacer together with the roll of web material may shift relative to the inflatable member. Additionally, to support and hold the vertically stacked rolls of web material with a diameter of approximately 45 inches requires an inflatable member with a width of at least approximately 30 inches. For larger rolls of web material with a larger diameter such as 58 inches or 70 inches requires an inflatable member with an even larger width which increases the cost of the device.

Thus a need has arisen for a new device which will support and cushion an object during shipment, which will protect the surface of the object from damage, which would protect the object from vibrations, quick stops and jarring movements while being shipped and which would being easily positioned and aligned with the object when packaging the object for shipping.

SUMMARY OF THE INVENTION

In accordance with one aspect of the present invention, there is provided an apparatus for supporting and cushioning objects during shipment. The apparatus includes an inflatable member and a pad. The pad has a honeycomb core, a front face and a rear face. The rear face of the pad has a rear recess adapted to hold the inflatable member. The rear recess is bounded by at least two sidewalls that capture and hold the inflatable member within the rear recess. The front face of the pad may also include a front recess for cooperatively receiving the surface of the object. The front recess may be defined by a portion of the pad in which the honeycomb core has been compressively deformed to a predetermined depth and a predetermined width to cushion the object received in the front recess.

In accordance with another aspect of the present invention, there is provided an apparatus for supporting and cushioning a roll of web material during shipment. The apparatus includes an inflatable member and a pad. The pad has a honeycomb core, a front face and a rear face. The rear face of the pad has a rear recess adapted to hold the inflatable member. The rear recess is bound by at least two sidewalls for capturing and holding the inflatable member within the rear recess. The front face of the pad has a generally concave front recess for cooperatively receiving the roll of web material. The generally concave front recess is defined by a portion of the pad in which the honeycomb core has been compressively deformed to a predetermined depth and a predetermined width to cushion the roll of web material received in the front recess.

In accordance with a further aspect of the present invention, there is an assembly for supporting and cushioning opposed rolls of web material during shipment. The assembly includes a spacer and a bag pad. The spacer is a honeycomb pad having a front face and a rear face. The rear face of the spacer is substantially flat, and front face of the spacer has a generally concave recess for cooperative receiving one of the rolls of web material. The bag pad includes an inflatable member and a pad having a front face and a rear face. The rear face has a rear recess for holding the inflatable member. The front face has a generally concave front recess for cooperatively receiving one of the rolls of web material. The spacer and bag pad are placed between the opposed rolls of web material such that the concave front recess of the spacer engages the crown of one of the rolls, and the concave front recess of the bag pad engages the crown of the other roll. The rear recess of the spacer engages the rear surface and air bag captured within the rear recess of the bag pad. The generally concave front recesses of both the spacer and bag pad may be defined by a portion of the pad in which the honeycomb core has been compressively deformed to a predetermined depth and a predetermined width to cushion the rolls of web material received in the front recesses.

BRIEF DESCRIPTION OF THE DRAWINGS

The foregoing and other advantages of the invention will become apparent upon reading the following detailed description and upon reference to the drawings which.

While the invention is susceptive to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF ILLUSTRATIVE EMBODIMENTS

Surprisingly, it has been discovered that a honeycomb bag pad of the present invention supports and cushions an object during shipment protecting the object from vibrations, quick stops and jarring movements. Additionally, the bag pad of the present invention protects the surface of the object from damage while being shipped. Furthermore, the bag pad of the present invention is easily positioned and aligned with the object when packaging the object for shipment.

Figures 1, 2:
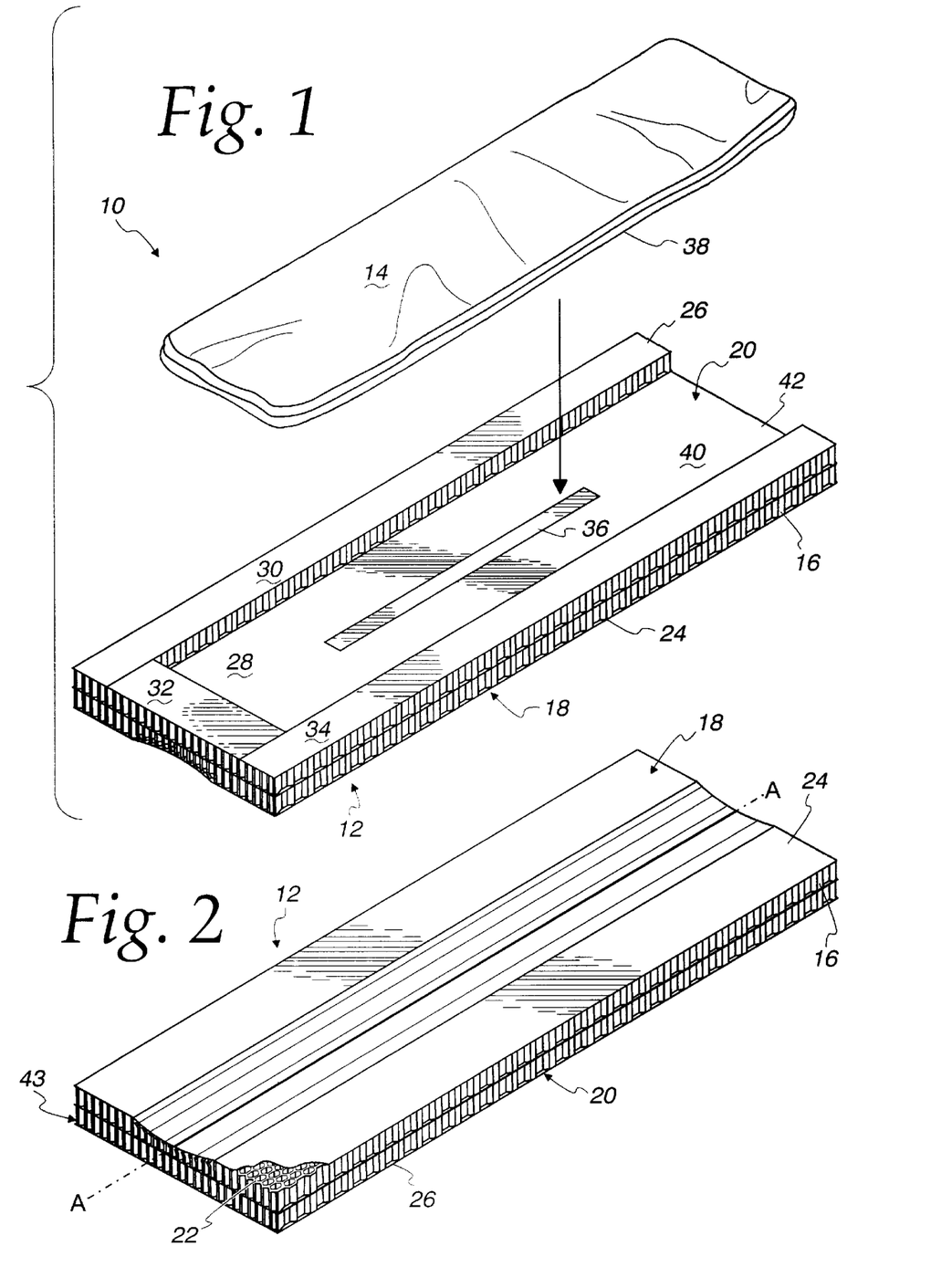
FIG. 1 is an isometric exploded view of one embodiment of a honeycomb bag pad in accordance with the present invention.
FIG. 2 is a partially broken isometric view of the honeycomb pad illustrated in FIG. 1.

FIG. 1 illustrates one embodiment of a honeycomb bag pad 10 of the present invention. The bag pad 10 comprises a pad 12 and an inflatable member or air bag 14. The pad 12 is a substantially flat pad of honeycomb material including a honeycomb core 16, a front face 18 and a rear face 20. The honeycomb core 16 is comprised of a plurality of honeycomb cells 22 disposed generally perpendicular to the front and rear faces 18 and 20. As depicted in FIGS. 1 and 2, a front face sheet 24 is adhered to the front face 18, and a rear face sheet 26 is adhered to the rear face 20. The front and rear face sheets 24 and 26 may be adhered to the front and rear faces 18 and 20 respectively with an adhesive as known to one of ordinary skill in the art. The honeycomb core 16 and face sheets 24 and 26 are preferably made of kraft paper, such as fully recyclable and biodegradable kraft paper; however, other materials such as metal foil and plastic sheet may be used. Additionally, the kraft paper may be resin impregnated for water resistance or other properties.

The rear face 20 of the pad 12 has a rear recess 28. The rear recess 28 is adapted to receive and hold the air bag 14. In the embodiment depicted in FIG. 1, the rear recess 28 is defined by three sidewalls 30, 32, and 34. The longitudinal sidewalls 30 and 34 position the air bag 14 within the pad 12. The width of the rear recess 28 is approximately equal to the width of the air bag 14 to allow the rear recess 28 to hold the air bag 14 within the rear recess 28. When the air bag 14 when inflated, it exerts a force against a surface 40 of the rear recess 28 and a force in the opposite direction. Because the longitudinal sidewalls 30 and 34 capture and hold the air bag 14, the force provided by the inflated air bag 14 is concentrated against the surface 40 of the rear recess 28 and in the direction opposite the rear surface 40. The lateral sidewall 32 assists in positioning the air bag 14 within the rear recess 28. In one embodiment, an adhesive means 36 adheres a front side 38 of the air bag 14 to the surface 40 of the rear recess 28. The adhesive means 36 may be any known in the art such as double face tape or glue.

In one embodiment, the pad 12 depicted in FIGS. 1 and 2 is approximately 27 inches wide and 72 inches in length. The rear recess 28 is approximately 20 inches wide and 66 inches in length. The honeycomb core 16 therein is approximately 4 inches thick from the front face 18 to the rear face 20 of the sidewalls 30, 32 and 34, and the honeycomb core is approximately 2 inches thick from the rear face 20 of the sidewalls 30, 32 and 34 to the surface 40 of the rear recess 28. The air bag 14 is a standard air bag with six plies having a width of approximately 18 inches and a length of approximately 60 inches.

The bag pad 10 is preferably assembled with the air bag 14 in its unexpanded state. Therefore, the front side 38 of the unexpanded air bag 14 is adhered to the surface 40 of the rear recess 28 with the adhesive means 36. When the bag pad 10 is to be used for supporting and protecting objects during shipment, the bag pad 10 is first positioned, and then the air bag 14 is inflated by the operator. Because the rear recess 28 is bounded on only three sides by the sidewalls 30, 32 and 34, the operator accesses the air bag 14 through the end 42 without a sidewall to inflate the air bag 14.

Figure 3:
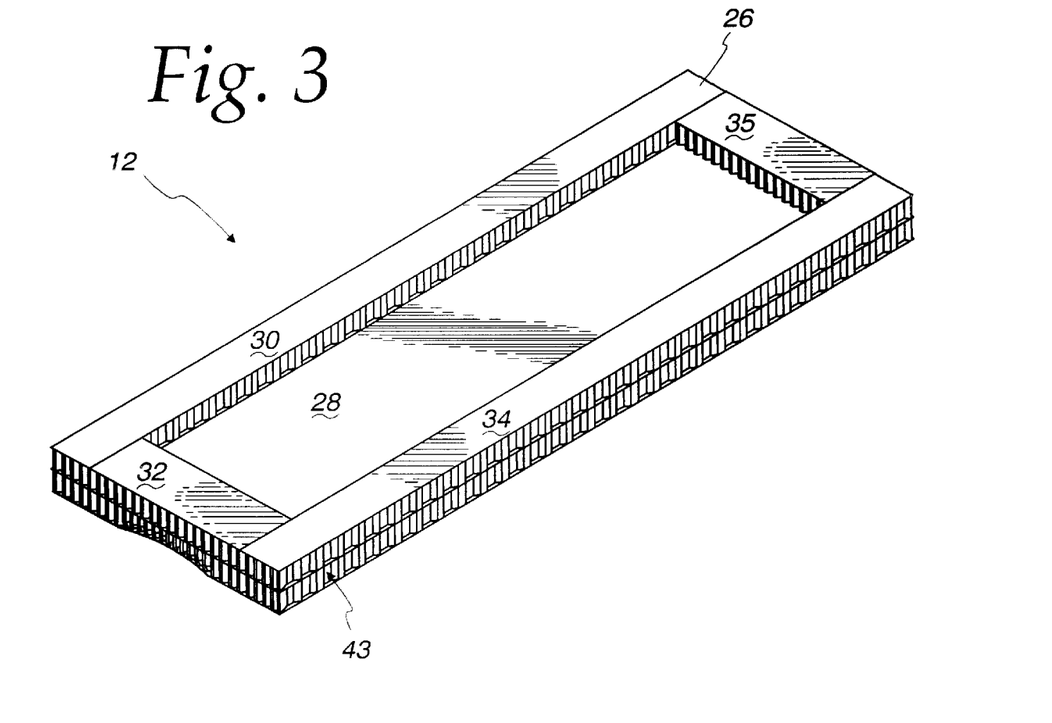
FIG. 3 is an isometric view of the another embodiment for the honeycomb pad.

FIG. 3 illustrates another embodiment of the pad 12. The pad 12 in FIG. 3 includes a fourth sidewall 35 bounding the rear recess 28. The four sidewalls 30, 32, 34 and 35 fully capture and hold the air bag 14 within the rear recess 28. In this embodiment, the pad 12 is approximately 27 inches wide and 72 inches long. The rear recess 28 is approximately 20 inches wide and 60 inches in length to capture and hold the 18 inches wide and 60 inches long air bag 14. A channel (not shown) may be formed in the fourth sidewall 35 to allow the operator access to inflate the air bag 14.

In the embodiment depicted in FIG. 1, the rear recess 28 in the pad 12 is formed by adhering sidewalls 30, 32, and 34 of substantially flat honeycomb panels to another substantially flat honeycomb panel 43. For example, the pad 12 may be formed by adhering the sidewalls 30 and 34 each having a width of 3.5 inches, a length of 72 inches and thickness of 2 inches and by adhering the sidewall 32 having a width of 6 inches, length of 20 inches, and thickness of 2 inches, to the honeycomb panel 43 having a width of 27 inches, length of 72 inches and thickness of 2 inches. The sidewall panels 30, 32, and 34 may be adhered to the panel 43 using an adhesive such as glue as known to one of ordinary skill in the art.

Figure 4:
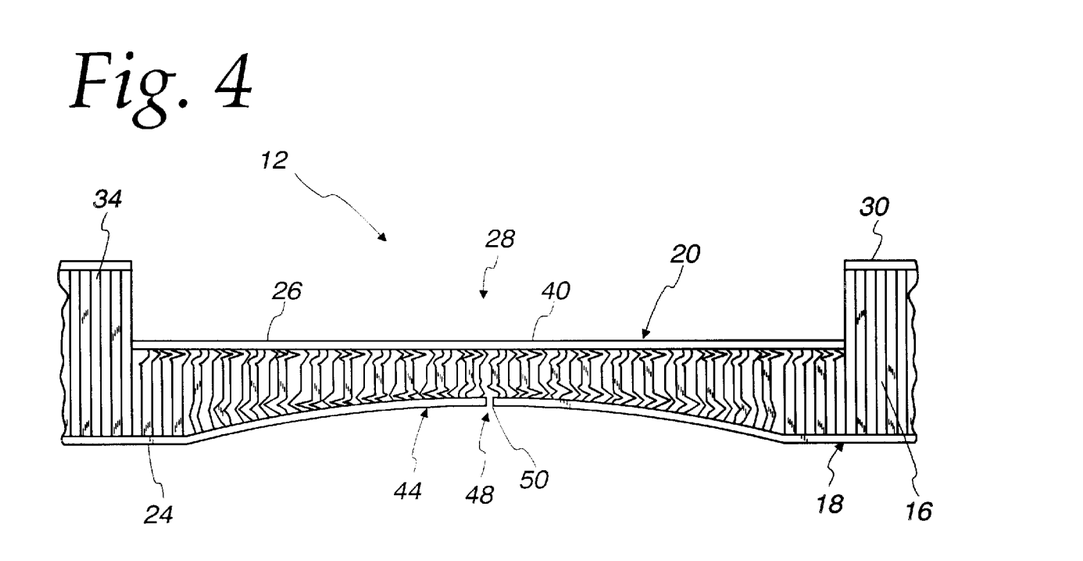
FIG. 4 is a cross sectional view of another embodiment for the honeycomb pad.

In another embodiment depicted in FIG. 4, the rear recess 28 in the pad 12 is formed by punch cutting a substantially flat honeycomb pad. In punch cutting, the honeycomb core 16 of the pad is simultaneously cut and compressively deformed. The method and apparatus for cutting and compressively deforming the honeycomb core is described in U.S. patent application Ser. No. 08/553,582 entitled "Prestressed Honeycomb, Method and Apparatus Therefor" assigned to the present assignee and is incorporated by reference herein. To cut and deform the honeycomb core 16 to form the rear recess 28, a knife means, as known in the art, cuts the rear face sheet 26 to outline the sidewalls 30, 32 and 34. The honeycomb core 16 of the rear face 20 is then substantially continuously deformed under compressive conditions to a predetermined depth with a die press. In addition to punch cutting with the die, the honeycomb core may be substantially continuously deformed with incremental compression rollers as is known in the art.

After compressively deforming the rear face 20 of the pad 12, the surface 40 of the rear recess 28 is bounded by the sidewalls 30, 32 and 34. In this embodiment, because the rear recess 28 is formed by compressively deforming the honeycomb core 16, the pad 12 provides increased shock absorbency. In one embodiment, the pad 12 may comprised honeycomb core 16 having a thickness of approximately 4 inches. After the rear recess 28 has been formed by compressively deforming the honeycomb core 16, the panel is approximately 4 inches thick from the front face 18 to the rear face 20 of the sidewalls 30, 32 and 34, and the honeycomb core is approximately 2 inches thick from the rear face 20 of the sidewalls 30, 32 and 34 to the surface 40 of the rear recess 28.

In a further embodiment, the rear recess 28 in the pad 12 is formed by cutting and removing a portion of the honeycomb core 16. A series of rotary knife means, as known in the art, cut the rear face sheet 26 and adjacent honeycomb core 16 to outline the sidewalls 30, 32 and 34. After completely removing a portion of the honeycomb core 16 adjacent the rear face 20 of the pad 12, the surface 40 of the rear recess 28 is bounded by the sidewalls 30, 32 and 34. Because the rear face sheet 26 of the rear recess 28 was removed by the rotary knife means to form the rear recess 28, a new rear recess face sheet may be adhered to the surface 40 of the rear recess. In one embodiment, the pad 12 may comprised honeycomb core 16 having a thickness of approximately 4 inches. After the rear recess 28 has been formed by removing a portion of the honeycomb core 16, the panel is approximately 4 inches thick from the front face 18 to the rear face 20 of the sidewalls 30, 32 and 34 and approximately 2 inches thick from the front face 18 to the surface 40 of the rear recess 28.

In the embodiment of the bag pad 10 illustrated in FIG. 1, the front face 18 of the honeycomb pad 12 has a front recess 44. The front recess 44 is adapted to conform to the surface of the object that the bag pad supports and protects during shipment. The front recess 44 may be conformed to the surface of any object. The shaped front recess 44 assists in positioning the bag pad 10 against the object and helps support and cushion the object. The front recess 44 substantially aligns with the rear recess 28 on opposite side of the honeycomb pad 12 to transfer the force of the inflated air bag 14 from against the surface 40 of the rear recess 28 to the front recess 44 and thus to the object positioned against the front recess 44.

Figure 5:
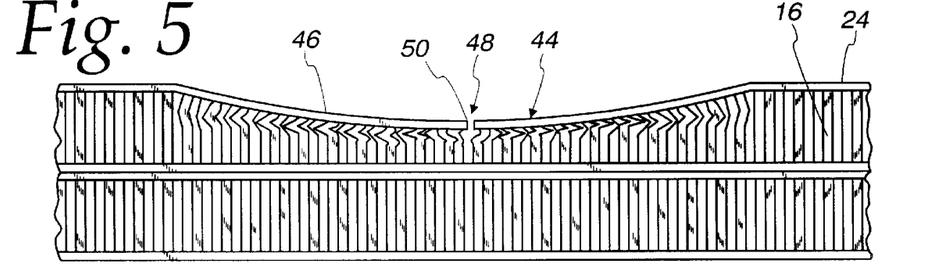
FIG. 5 is a cross sectional view of an embodiment for the honeycomb pad.
Figure 7:
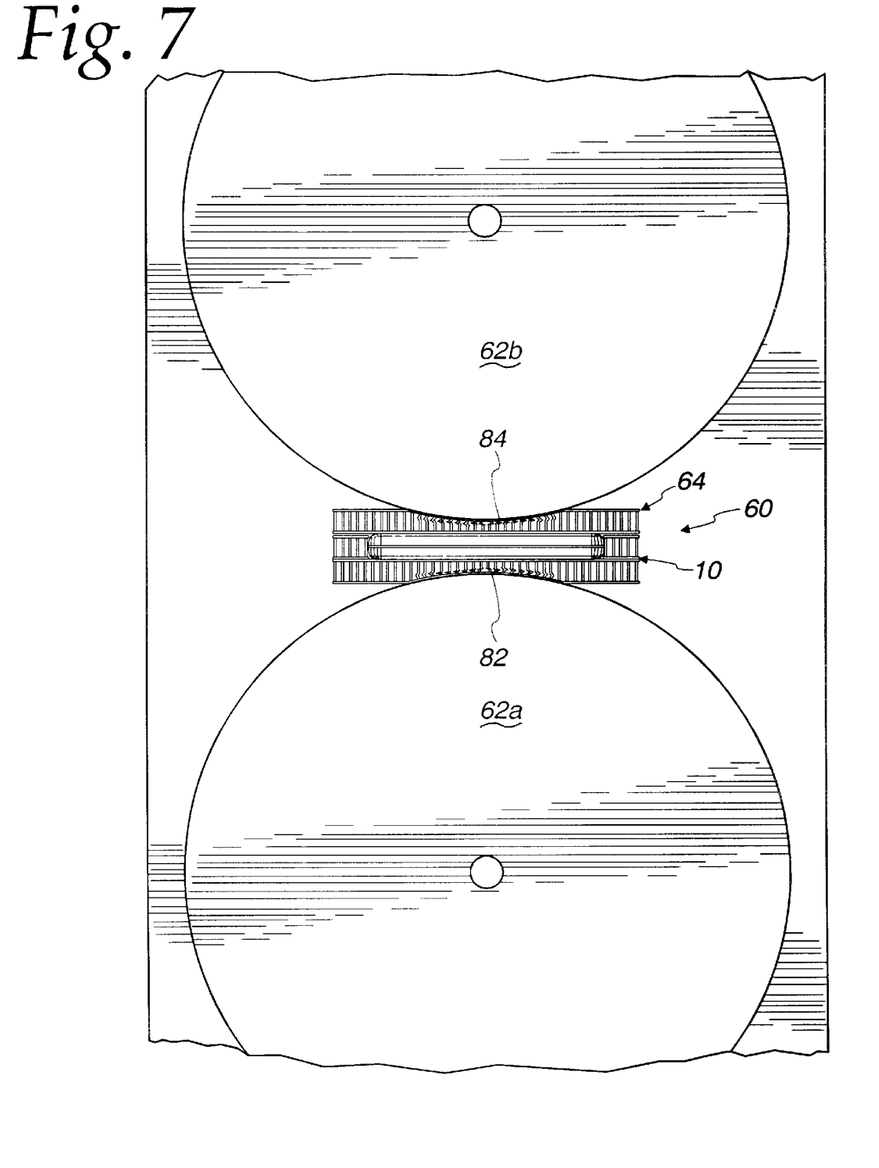
FIG. 7 is a top plan view of the assembly in FIG. 6 supporting and cushioning vertically stacked rolls of web material.

In the embodiment depicted in FIGS. 1, 2, 3, 4 and 5, the front recess 44 is generally concavely shaped to conform to the surface of an elongate roll of web material (see FIG. 7). The front recess 44 is similar to the recess described in U.S. Pat. No. 5,678,968 entitled "Honeycomb Roll Spacer" assigned to the present assignee and is incorporated by reference herein. The front recess 44 extends the length of the pad 12 centrally along the longitudinal and central axis A of the pad 12. The front recess 44 is designed to contact as much of the length of the roll of web material as possible. As illustrated in FIG. 5, the front recess 44 has a bottom concave surface 46 including a centrally disposed elongate aperture 48 defined by a slit 50 that has been cut into the front face sheet 24 and which extends the length of the front recess 44 and pad 12 along and co-linearly with the longitudinal axis A of the pad 12. The slit 50 is preferably positioned centrally within the bottom surface 46 of the front recess 44. Although FIG. 5 depicts only one slit 50, additional slits may be cut into the front face sheet 24 in the region of the front recess 44.

As illustrated in FIG. 5, the front recess 44 is defined by a central, longitudinal portion of the pad 12 in which the honeycomb core 16 and front face sheet 24 have been compressively deformed to a predetermined depth using a semi-elliptical shaped die press. The method and apparatus for forming the concave recess 44 is more fully described in described in U.S. Pat. No. 5,678,968 entitled "Honeycomb Roll Spacer" assigned to the present assignee and is incorporated by reference herein. The front recess 44 may also be formed using elliptical shaped compression rollers. This method and apparatus for forming the concave recess 44 is more fully described in as described in U.S. patent application Ser. No. 08/715,575 entitled "Apparatus for Manufacturing a Roll Spacer" assigned to the present assignee and is incorporated by reference herein.

In one embodiment to accommodate rolls of web material having a diameter ranging from about 45 to 60 inches and a length of about 72 inches, the pad 12 is about 27 inches wide and 72 inches long, and the honeycomb core 16 therein is about 4 inches thick from the front face 18 to the rear face 20 at the sidewalls 30, 32 and 34. The rear recess 28 is approximately 18 inches wide and 66 inches long, and the honeycomb core 16 of the sidewalls 30, 32 and 34 is approximately 2 inches thick. The rear recess 28 accommodates the standard six ply air bag 14 is a standard air bag which is approximately 18 inches wide and 60 inches in length. The front recess 44 extends the length of the pad 12 and has a width of about 7 inches and a depth of about 0.5 inch.

The dimensions of the bag pad 10 may be modified to suit any particular purpose. For supporting and cushioning rolls of web material, the width of the rear recess 28 and the width of the air bag 14 would preferably remain approximately 18 inches even for larger diameter rolls. The width of the rear recess 28 and air bag 14 may maintain this size because the force provided by the air bag 14 is concentrated against the crown of the roll of web material to support any size roll. For longer rolls of web material, such as 100 inches long, the length of the pad 12 and front recess 44 would be increased to approximately 100 inches long to contact as much of the length of the roll of web material as possible. The length of the rear recess 44 and air bag would also be increased to about 97 inches accommodate the longer roll. The depth and width of the front recess 44 may be modified to fit any diameter of the roll of web material, for example, the front recess 44 may have a width anywhere between about one fifth the width of the pad 12 to a width which is substantially the entire width of the pad 12. The depth of the front recess 44 may be anywhere between about one third of the depth of the honeycomb core 16 to about two thirds the depth of the honeycomb core 16 depending on the size and weight of the roll of web material intended to be cushioned and supported by the bag pad 10.

Figure 6:
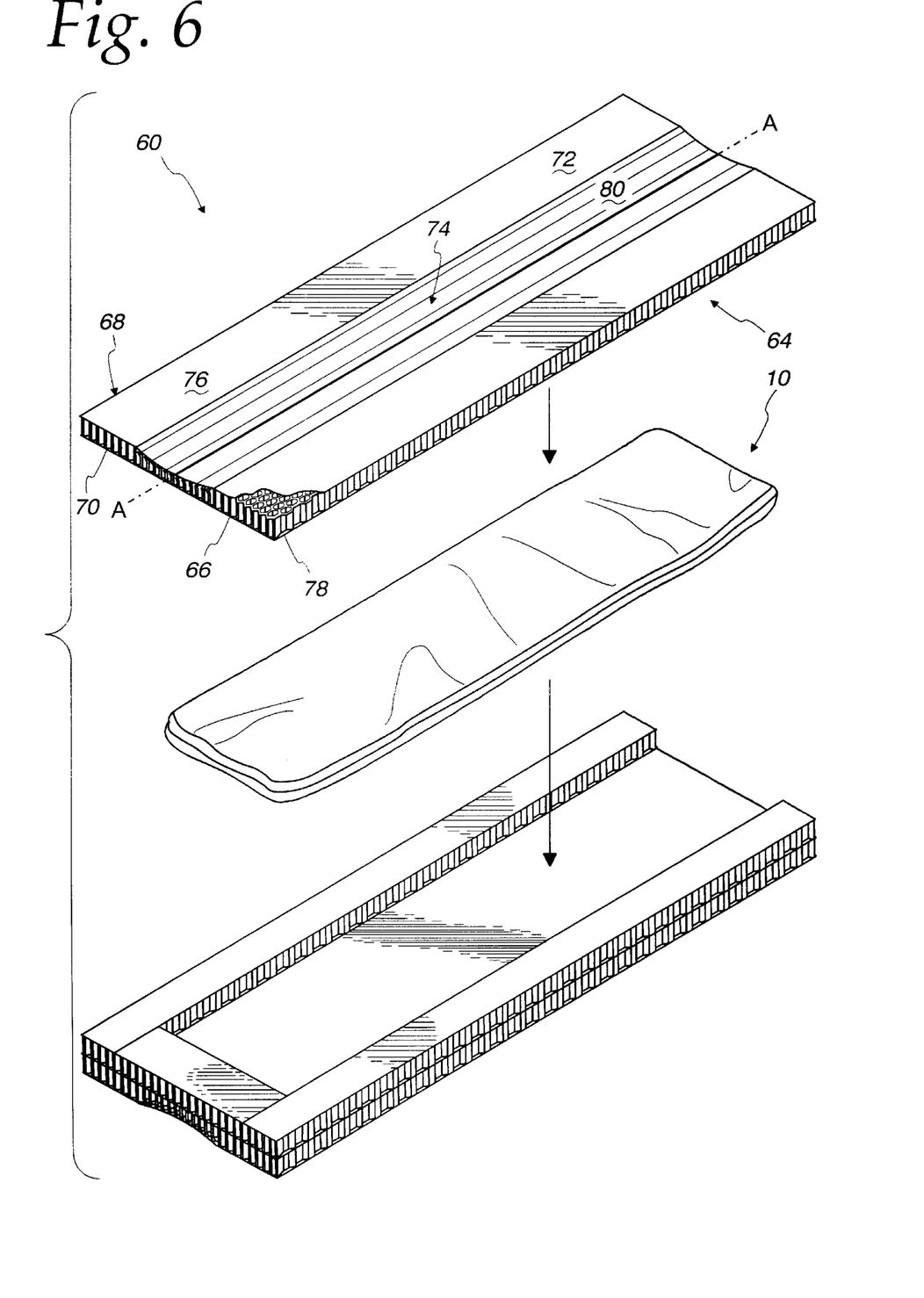
FIG. 6 is an isometric exploded view of an assembly for supporting and cushioning rolls of web material.

The bag pad 10 may be used in an assembly 60 for supporting and cushioning a plurality of vertically disposed rolls of web material 62a and 62b for shipment in a container such as a rail car. The assembly 60 as depicted in FIG. 6 comprises a bag pad 10 and an opposed spacer 64. The bag pad 10 is as described above. The spacer 64 is similar to the pad 12 described above, but the spacer 64 does not have a rear recess. Instead, the spacer 64 has a rear face 66 that is substantially flat. The spacer 64 includes a pad 68 of honeycomb core 70 with a front face 72, and the rear face 66. In one embodiment, the front face 72 has a generally concavely shaped front recess 74 identical to the front recess 44 described above. In addition, a front face sheet 76 is adhered to the front face 72, and the rear face 66 has a rear face sheet 78. The front and rear face sheets 76 and 78 may be adhered to the front and rear faces 72 and 66 with an adhesive as described above. The front recess 74 is generally concavely shaped with a bottom concave surface 80 to conform to the surface of a roll of web material 62b. Similar to the front recess 44 of the bag pad 10 discussed above, the front recess 74 of the spacer 64 is defined by a central, longitudinal portion of the pad 68 in which the honeycomb core 70 and front face sheet 76 have been compressively deformed to a predetermined depth. The front recess 74 of the spacer aligns longitudinally with the rear recess 28 of the bag pad 10 to ensure the force provided by the air bag 14 in the assembly 60 is concentrated along the front recess 74.

To cushion and support the rolls of web material 62a and 62b during shipment, the bag pad 10 is inserted adjacent the elongate, cylindrical roll of web material 62a such that the crown 82 of the roll of web material 62a is tightly received in and cushioned with the concave surface 46 of the front recess 44 of the bag pad 10. The spacer 64 is then inserted such that the crown 84 of an adjacent roll of web material 62b is tightly received in and cushioned with the concave surface 80 of the front recess 74 of the spacer 64. One or more honeycomb fillers (not shown) may be optionally inserted between the bag pad 10 and spacer 64 to fill any remaining voids between the adjacent rolls of web material 62a and 62b. In the embodiment depicted in FIG. 7 and 8, the bag pad 10 and spacer 64 completely fill the void between the adjacent rolls of web material. Once the void between the adjacent rolls of web material 62a and 62b, the air bag 14 is inflated.

Figure 8:
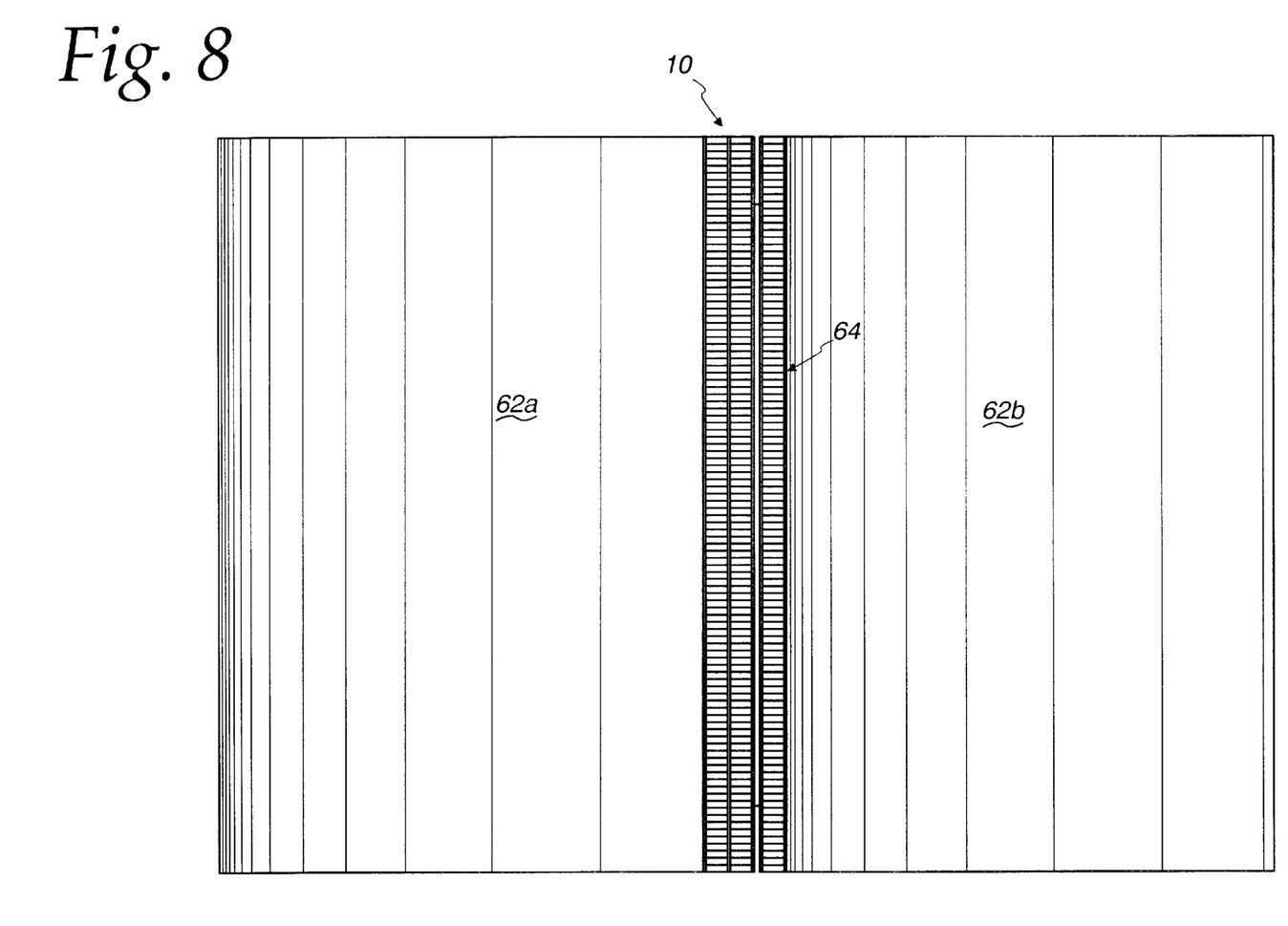
FIG. 8 is a side plan view of the assembly in FIG. 6 supporting and cushioning vertically stacked rolls of web material.

The inflated air bag 14 captured in the rear recess 28 of the bag pad 10 and bounded by the rear face 66 of the spacer 64 exerts a force against the rear face 66 of the spacer 64 and surface 40 of the rear recess 28. This force is distributed by the front recess surface 46 of the bag pad 10 and by the front recess surface 80 of the spacer 64 over the engaged surface of the rolls of web material 62a and 62b. Thus, the force provided by the air bag 14 is directed against the crowns 82 and 84 of the rolls of web material 62a and 62b. Since the pressure supplied by the air bag 14 is distributed longitudinally along the rolls of web material, the rolls of web material 62a and 62b are securely fixed to protect the rolls of web material 62a and 62b from vibrations, quick stops and jarring movements. Additionally, the air bag 14 fills any unwanted space between the rolls of web material 62a and 62b to ensure the rolls of web material do not move.

The bag pad 10 along with the spacer 64 are easily positioned and aligned with the rolls of web material 62a and 62b when packaging the rolls for shipment. The operator simply places the bag pad 10 between the rolls of web material 62a and 62b and aligns the front recess 44 against the crown 82 of the roll 62a. The spacer 64 is then aligned such that the recess 74 aligns with the crown 84, and the spacer is slid between the roll of web material 62b and the rear surface 20 of the bag pad 10. If any space remains between the assembly 60 and rolls of web material 62a and 62b, additional flat honeycomb panels may be inserted between the bag pad 10 and spacer 64. The operator may inflate the air bag 14 within the rear recess 28 of the bag pad 10 through the open end 42 of the panel 12. Because the air bag 14 is held within the rear recess 28 of the bag pad 10, the air bag 14 is always correctly positioned to provide the force against the crowns 82 and 84 of the rolls of web material 62a and 62b. A rail car shipment of rolls of web material may be supported and cushioned with a plurality of assemblies 60 by positioning one assembly 60 as described above between each pair of opposed rolls of web material.

According to the invention, the front recess 44 of the bag pad 10 and the recess 72 of the spacer 64 are shaped to tightly receive and support the rolls 62a and 62b thus offering little chance for the rolls to move forward or side to side during shipment. The compressed honeycomb which forms the recesses 44 and 74 advantageously provides a spring-like cushion for the rolls 62a and 62b and protects them from vibration, quick stops, and the rough jarring movements of rail car coupling without the breakup or crushing of either the rolls 62a and 62b or the bag pad 10 or the spacer 64. Additionally, the compressed honeycomb absorbs some of the shock and force which would ordinarily be fully transferred from the rolls 62a and 62b to the air bag 14. As a result, the air bag 14 remains at or near its original pressure throughout the shipment thus assuring its optimal performance for the entire time of transport.

The use of a the front face sheets 24 and 72 on the bag pad 10 and spacer 64 respectively prevents the web material on the rolls 62a and 62b from being embossed with the honeycomb pattern of the honeycomb cells. The front face sheets 24 and 72 also prevent the web material from being "grasped" by the open honeycomb cells during transport and thus eliminating the risk of tearing and abrasion of the web material during transport.

The embodiment of the bag pad 10 described above is specifically used to support, cushion and protect rolls of web material during shipment. In addition, the bag pad may be used to support, cushion and/or protect any object, including but not limited to furniture, palleted loads, food, bricks and partial loads, being shipped by truck, rail, ship or any mode of transportation. To accommodate other objects, the front recess of the bag pad may be designed to conform to the surface of these objects. For example, to support and protect an object that has a polygonal shaped surface, the front recess would be generally polygonal to receive the object. Additionally, the dimensions of the bag pad may be modified to fit any object, and the air bag may be modified to provide greater force for heavy objects or less force for light objects.

Another example use for the bag pad is by commercial and/or residential movers to support, cushion and/or protect furniture. Bag pads may be placed between the furniture and the sidewalls of the shipping container to brace the furniture preventing it from moving or jarring. Additional bag pads may be placed between adjacent pieces of furniture to fill any open spaces and to support and protect the shipment. To accommodate various types of furniture, the front recess may be modified to conform to the surfaces of the furniture. Additionally, the dimensions of the bag pad may be modified to fit the furniture, and the air bag may be modified to provide greater force for heavy furniture or less force for light furniture.

Additionally, the bag pad may be used to support, cushion and/or protect palleted loads. Bag pads may be placed between the pallets and the sidewalls of the shipping container to brace the pallets preventing them from moving or jarring. Additional bag pads may be placed between adjacent pallets to fill any open spaces and to support and protect the shipment. Instead of bracing just the pallets, the bag pads may also be assembled to support, cushion and/or protect the loads assembled on the pallets. To accommodate the pallets and/or their loads, the front recess may be modified to conform to the surfaces of the pallets and/or the loads. Additionally, the dimensions of the bag pad may be modified to fit the pallets and/or the loads, and the air bag may be modified to provide greater force for heavy loads or less force for light loads.

While particular embodiments and applications of the present invention have been illustrated and described, it is to be understood that the invention is not limited to the precise construction and compositions disclosed herein and that various modifications, changes and variations will be apparent from the foregoing descriptions without departing from the spirit and scope of the invention as defined in the appended claims.

What is claimed is:

1. An apparatus for supporting and cushioning an elongate roll of web material during shipment comprising:
   an inflatable member; and
   a substantially flat, elongate pad having a honeycomb core, a front face and a rear face, said rear face having a rear recess adapted to hold said inflatable member, said front face having a generally concave front recess for cooperatively receiving said roll of web material.

2. The apparatus of claim 1 wherein said rear recess has a width substantially similar to a width of said inflatable member.

3. The apparatus of claim 1 wherein said rear recess is substantially flat to receive and hold said inflatable member.

4. The apparatus of claim 1 wherein said rear face has a rear face sheet secured to said honeycomb core.

5. The apparatus of claim 1 wherein said rear recess is bound by at least two sidewalls capable of capturing and holding said inflatable member within said rear recess.

6. The apparatus of claim 1 further including an adhesive means adhering said inflatable member to a surface of said rear recess.

7. The apparatus of claim 6 wherein said adhesive means is double faced tape.

8. The apparatus of claim 1 wherein said front face has a front face sheet secured to said honeycomb core.

9. The apparatus of claim 1 wherein said generally concave front recess being defined by a portion of said pad in which said honeycomb core has been compressively deformed to a predetermined depth and a predetermined width to cushion said roll of web material received in said recess.

10. The apparatus of claim 9 wherein said pad further includes a front face sheet secured at said front face and a slit located in said front recess and extending only through said front face sheet and a portion of said honeycomb core.

11. The apparatus of claim 1 wherein said pad further includes a length, a width and a longitudinal axis along said length of said pad, said front recess extending substantially said length of said pad and centrally thereon along said longitudinal axis.

12. The apparatus of claim 1 wherein said rear recess substantially aligns with said front recess along a longitudinal axis of said pad such that a force provided by said inflatable member is substantially transferred from said rear recess to said front recess.

13. The apparatus of claim 1 wherein said inflatable member has a width less than thirty inches.

14. An apparatus for supporting and cushioning objects during shipment comprising:
    an inflatable member; and
    a pad having a honeycomb core, a front face and a rear face, said rear face having a rear recess adapted to hold said inflatable member.

15. The apparatus of claim 14 wherein said rear recess has a width substantially similar to a width of said inflatable member.

16. The apparatus of claim 14 wherein said rear recess is substantially flat to receive and hold said inflatable member.

17. The apparatus of claim 14 wherein said rear face has a rear face sheet secured to said honeycomb core.

18. The apparatus of claim 14 wherein said rear recess is bound by at least two sidewalls capable of capturing and holding said inflatable member within said rear recess.

19. The apparatus of claim 14 wherein said rear recess is formed by punch cutting said pad to simultaneously cut and compressively deform said honeycomb core to a predetermined depth.

20. The apparatus of claim 18 wherein said rear recess and said sidewalls are formed by adhering at least two sidewall honeycomb panels to said pad.

21. The apparatus of claim 14 further including an adhesive means adhering said inflatable member to a surface of said rear recess.

22. The apparatus of claim 21 wherein said adhesive means is double faced tape.

23. The apparatus claim 14 wherein said front face has a front recess conformed to receive said object.

24. The apparatus of claim 23 wherein said rear recess substantially aligns with said front recess along a longitudinal axis of said pad such that a force provided by said inflatable member is substantially transferred from said rear recess to said front recess.

25. The apparatus of claim 23 wherein said front recess being defined by a portion of said pad in which said honeycomb core has been compressively deformed to a predetermined depth and a predetermined width to cushion said object received in said recess.

26. The apparatus of claim 14 wherein said front face has a front face sheet secured to said honeycomb core.

27. An assembly for supporting and cushioning opposed first and second rolls of web material during shipment comprising:
    a spacer comprising a first substantially elongate pad having a first honeycomb core, a first front face and a first rear face, said first rear face having a substantially flat surface, said first front face having a first generally concave front recess for cooperative receiving said first roll of web material; and
    a bag pad comprising an inflatable member having a first side and a second side and a second substantially elongate pad having a second honeycomb core, a second front face and a second rear face, said second rear face having a rear recess with a recess surface adapted to hold said inflatable member, said second side of said inflatable member abutting said recess surface of said second pad and said first side of said inflatable member abutting said flat surface of said first rear face of said spacer, said second front face having a second generally concave front recess for cooperatively receiving said second roll of web material.

28. The assembly of claim 27 wherein said first generally concave front recess being defined by a portion of said first pad in which said first honeycomb core has been compressively deformed to a first predetermined depth and a first predetermined width to cushion said first roll of web material received in said first recess, said second generally concave front recess being defined by a portion of said second pad in which said second honeycomb core has been compressively deformed to a second predetermined depth and a second predetermined width to cushion said second roll of web material received in said second recess.

* * * * *